United States Patent [19]

Ip

[11] Patent Number: 6,141,130
[45] Date of Patent: Oct. 31, 2000

[54] SPECTRAL EQUALIZER FOR MULTIPLEXED CHANNELS

[75] Inventor: Joseph Ip, Kanata, Canada

[73] Assignee: JDS Fitel Inc., Nepean

[21] Appl. No.: 09/007,174

[22] Filed: Jan. 14, 1998

[51] Int. Cl.[7] .................................................. H04B 10/16
[52] U.S. Cl. ........................ 359/179; 359/124; 359/130; 359/161; 359/176; 359/341
[58] Field of Search ..................................... 359/127, 130, 359/161, 176, 179, 341

[56] References Cited

U.S. PATENT DOCUMENTS

| | | | |
|---|---|---|---|
| 4,861,136 | 8/1989 | Stone et al. | 350/96.3 |
| 5,557,468 | 9/1996 | Ip | 359/615 |
| 5,880,874 | 3/1999 | Shibuya et al. | 359/337 |

OTHER PUBLICATIONS

NT& T&T prefilters multiplexer with asymmetric Mach Zehnder Okamoto et al IEEE PTL, Mar. 1996.

*Primary Examiner*—Leslie Pascal
*Assistant Examiner*—Hanh Phan
*Attorney, Agent, or Firm*—Neil Teitelbaum

[57] ABSTRACT

An optical element having a periodically varying spectral response is used to flatten the spectral amplitudes within each of a group of multiplexed channels having different predetermined central wavelengths with uneven spectral amplitudes peaked around the central wavelengths. Spectral equalization is achieved by having the amplitude valleys of the spectral response aligned individually with the different central wavelengths. The optical element comprises an optical cavity, which forms part of a low-finesse Fabry-Perot etalon.

14 Claims, 3 Drawing Sheets

SPECTRAL EQUALIZER FOR MULTIPLEXED CHANNELS

FIELD OF THE INVENTION

This invention relates to spectral equalizers and is particularly concerned with amplitude equalization of wavelength-division multiplexed channels

BACKGROUND OF THE INVENTION

In broadband communication systems, a number of individual channels are often multiplexed for transmission over a common medium in order to save transmission cost. One method of multiplexing makes use of wavelength (or frequency) division, were individual channels are carried over different non-overlapping spectral bands. With such a method a communication system typically includes the following components between a signal source and a destination:

a) a multiplexer for grouping more than one individual channel into a signal form suitable for transmission over a single medium, b) a transmission medium, c) a demultiplexer for extracting individual channels from the multiplexed signal.

In addition, a variety of other system components are interspersed among the above components, such as amplifiers, modulators, demodulators, filters, etc. Many of such components introduce some degree of non-linearity in the signal leading to undesirable distortion and errors. It is normally desirable to maintain a flat spectral response within each channel in the system so that different wavelengths undergo similar gain or attenuation when passing through various stages of a communication system.

A variety of spectrum equalizing (or flattening) techniques have been developed to address such problem. For example, in U.S. Pat. Nos. 5,532,870 and 5,640,269, Shigematsu et al disclose an optical fiber amplifier which reduces the wavelength dependency of gain in various wavelength ranges in wavelength division multiplexing transmission, by using at least two kinds of optical fibers serially coupled each having a glass composition selected from at least two kinds of rare-earth-doped glass compositions. Another example is the optical amplifier disclosed by Minelly and Laming in U.S. Pat. No. 5,526,175, which amplifies signals of different wavelengths throughout a spectral window while equalizing the output levels of the signals, by using a dichroic reflector at one end of an amplifying fiber to set up standing wave patterns therein by interference of the forward and reflected signal lights, at the different wavelengths. Furthermore, daSilva et al disclose in U.S. Pat. No. 5,345,332 a technique for channel-by-channel power regulation in a multiwavelength lightwave communications system, by using a cascade of inhomogeneously broadened saturated fiber amplifiers spaced along the optical fiber transmission path.

The above disclosed techniques, however, are either too complex or more applicable to band-limited optical communication systems and may, therefore, present expensive solutions for systems transmitting a relatively large number of multiplexed channels. Such a problem is of a particular concern in optical communication systems where the selection of equalizing filters is more limited than in traditional radio communication systems. There is, therefore, clearly an important need for more economical solutions for equalizing wavelength-division multiplexed channels, especially in the case of lightwave communications.

SUMMARY OF THE INVENTION

An object of this invention is to provide a spectral (amplitude-wavelength) equalizer that may be applied to a group of wavelength division multiplexed channels, to provide a less complex and more economical solution than conventional single-channel spectral equalizers.

In accordance with an aspect of the present invention there is provided an optical spectral equalization system for equalizing amplitudes within each channel of a group of multiplexed channels having different predetermined central wavelengths. The spectral equalizer comprises an optical element having a periodically varying spectral response characterized by amplitude valleys aligned individually with the different central wavelengths. The equalizer further comprises a first port optically coupled to said optical element for receiving said group of multiplexed channels, and a second port optically coupled to said optical element for providing a group of equalized channels corresponding to the group of multiplexed channels in accordance with said spectral response. When multiplexed channels having uneven spectral amplitudes peaked around the central wavelengths thereof are received at the first port, the second port provides corresponding equalized channels having more even spectral amplitudes around said central wavelengths than the received channels.

In an embodiment of the present invention, the optical element comprises an optical cavity having a spectral response including a periodic series of anti-resonance wavelengths, at least a portion thereof being similar to the central wavelengths of the multiplexed channels. Preferably, the optical cavity forms part of a low-finesse Fabry-Perot etalon. In another embodiment of the invention, the optical element comprises a Mach-Zehnder interferometer.

Advantageously, the invention can be used in an optical communication system which comprises a multiplexer-demultiplexer for equalizing and respectively multiplexing or demultiplexing a group of non-multiplexed or multiplexed channels having different predetermined central wavelengths. Such system includes a spectral equalizer as described above and a multiplexer-demultiplexer comprising a common port optically coupled to the second port of the equalizer for collectively transferring multiplexed channels between the spectral equalizer and the demultiplexer, and a plurality of separate ports, each for individually providing an equalized demultiplexed channel and for individually receiving one of the group of non-multiplexed channels to be multiplexed and equalized. In the case that non-multiplexed optical channels having uneven spectral amplitudes peaked around the central wavelengths are individually received at the separate ports, the first port collectively provides corresponding equalized multiplexed channels having more even spectral amplitudes around said central wavelengths than the individually received channels. In the alternative case that multiplexed channels having uneven spectral amplitudes peaked around the central wavelengths are collectively received at the first equalizer port, the separate ports individually provide corresponding equalized demultiplexed channels having more even spectral amplitudes around said central wavelengths than the collectively received channels.

Thus, the invention provides a single device to be used for equalizing the amplitude-wavelength response of a multitude of wave-division multiplexed channels instead of using separate equalizers for separate channels.

BRIEF DESCRIPTION OF THE DRAWINGS

Exemplary embodiments of the invention will now be described in conjunction with the drawings, in which:

In all the above figures, common reference numerals are used where applicable. FIGS. 2, 3 and 4 are only illustrative of the general shape of amplitude-wavelength relationships and are not drawn to scale.

DETAILED DESCRIPTION

Figure 1:
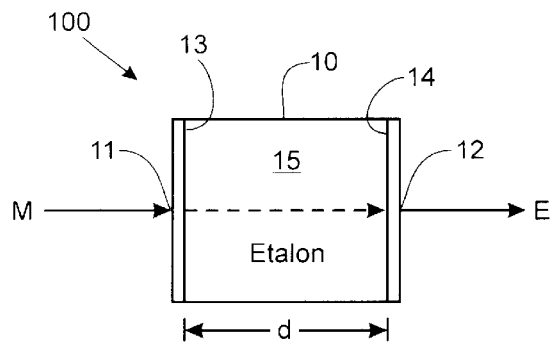
FIG. 1 is a schematic block diagram of a spectral equalizer using an optical element in accordance with this invention.
Figure 2:
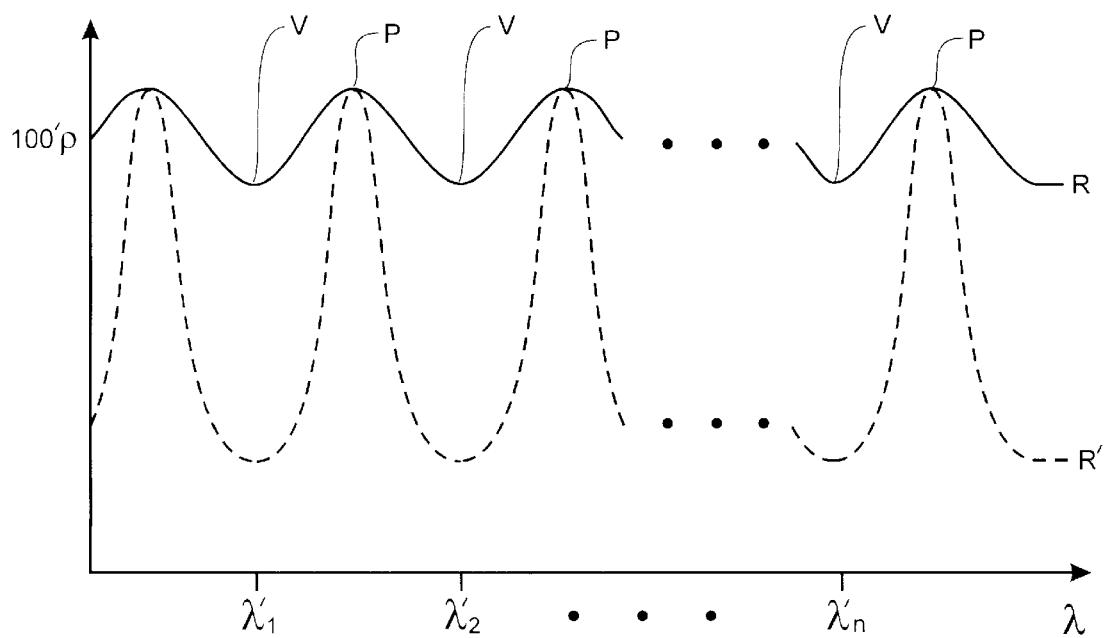
FIG. 2 is a graph illustrating a periodically varying spectral response of the optical element shown in FIG. 1.

As shown in FIG. 1, a Fabry-Perot etalon 10 has two spaced partially reflective surfaces (or mirrors) 13 and 14 of either equal or dissimilar reflectivity, facing each other and separated by a certain gap d, which forms a light transmissive resonating cavity 15. An etalon has typically a periodically varying spectral response with resonance and anti-resonance wavelengths spaced apart at regular wavelength intervals. FIG. 2 illustrates the spectral responses R and R' of low-finesse and high-finesse etalon devices shown in solid and dotted lines respectively. The high finesse etalon exhibits a spectral response periodically alternating between amplitude peaks P of 100% at resonance wavelengths and amplitude valleys V of relatively low value at anti-resonance wavelengths $\lambda_1'$, $\lambda_2'$, ... $\lambda_n'$. The low finesse etalon also exhibits a spectral response periodically alternating between amplitude peaks P of 100% at similar resonance wavelengths, but the amplitude valleys V have relatively higher values below 100% at similar anti-resonance wavelengths $\lambda_1'$-$\lambda_n'$ to those in the high finesse etalon.

The wavelength interval is often expressed in terms of free spectral range (FSR) and is determined by the gap spacing of the mirrors. The spectral response of an etalon is often characterized in terms of "finesse", which is a ratio of FSR over bandwidth (BW). The finesse is determined by the reflectivity of the mirrors. For example, a low finesse etalon may have a reflectivity of <70% and an FSR/BW ratio of <10%, whereas a high finesse etalon may have a reflectivity of >90% and an FSR/BW ratio of >100%.

Returning now to FIG. 1, there is illustrated in a block diagram, a spectral equalizer 100 in accordance with an embodiment of the present invention using an optical element 10 in the form of a Fabry-Perot etalon. The optical element 10 includes two reflective surfaces (or mirrors) 13 and 14 having similar reflectivity and being spaced by an optical cavity 15. The cavity 15 has a dimension d and contains light transmissive material. The optical element 10 has a periodically varying spectral response R as illustrated by the solid lines in FIG. 2. The spectral response R has amplitude valleys V at each of a periodic series of anti-resonance wavelengths $\lambda_1'$-$\lambda_n'$. The spectral equalizer 100 further includes a first port 11 and a second port 12, which are optically coupled to the optical element 10. The first port 11 is positioned to receive a group of n multiplexed channels M illustrated in FIG. 3 to have different predetermined central wavelengths $\lambda_1$, $\lambda_2$, ... $\lambda_n$ with uneven spectral amplitudes peaked around these central wavelengths $\lambda_1$-$\lambda_n$. The dimension d of the optical element 10 is so chosen that the central wavelengths $\lambda_1$-$\lambda_n$ are similar to at least a portion of anti-resonance wavelengths $\lambda_1'$-$\lambda_n'$ as illustrated in FIG. 2. This way, the central wavelengths $\lambda_1$-$\lambda_n$ are aligned individually with at least some of the amplitude valleys V.

Figure 4:
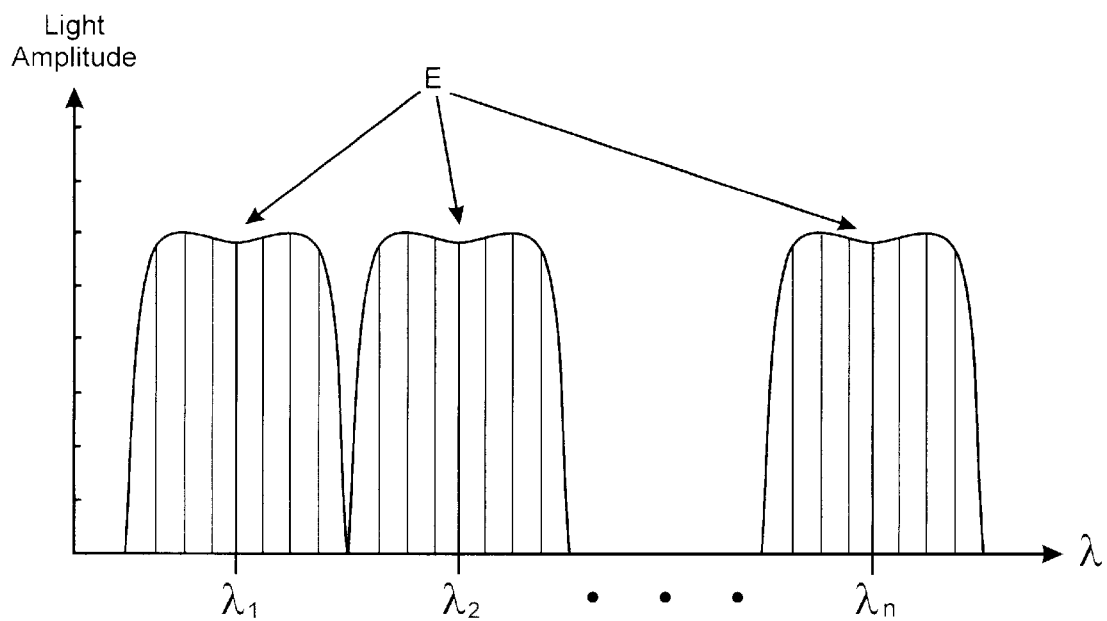
FIG. 4 is a graph illustrating amplitude-wavelength spectrum of a group of equalized channels to be provided in accordance with this invention to correspond to the group of multiplexed channels illustrated in FIG. 3.

When a light beam carrying a group of multiplexed optical channels M having central wavelengths $\lambda_1$-$\lambda_n$ is launched onto the spectral equalizer 100 through the first port 11, the spectrum of each of such received channels M is modified by the spectral response R of the optical element 10 as follows. The central wavelengths $\lambda_1$-$\lambda_n$ having the highest amplitudes within each channel undergo maximum attenuation by virtue of them being aligned with amplitude valleys V of the spectral response R of the low finesse etalon 10. For the same reason, other wavelengths on both sides of the central wavelengths $\lambda_1$-$\lambda_n$ having lower amplitudes the farther away they are from the central wavelenghts $\lambda_1$-$\lambda_n$, undergo a decreasingly lesser attenuation. The net result is that equalized channels E each having equalized amplitudes therein, as illustrated in FIG. 4, corresponding to the group of multiplexed channels M received at the first port 11 are provided at the second port 12. The spectral amplitudes of the equalized channels become flatter or more even around the central wavelengths $\lambda_1$-$\lambda_n$ than those of the received channels M.

The embodiment of FIG. 1 shows the first port 11 and the second port 12 to be on opposite sides of the etalon 10, which relates to a transmissive design of an etalon. Other embodiments can have the two ports on the same side of the etalon 10, which relate to a reflective design such as can be achieved with dissimilar reflectivity of the mirrors 13 and 14.

In the embodiment of FIG. 1, the first and second ports 11 and 12 are shown disposed for receiving and providing light beams from and to free space respectively. However, other preferred embodiments (not shown) have the first and second ports 11 and 12 defined by optical waveguides such as optical fibers. Such embodiments can further include graded index (GRIN) lenses (not shown) disposed at the first and second ports 11 and 12 respectively in a manner to enable collimating and focusing the light beam carrying the multiplexed channels out of and into an optical waveguide coupled thereto. Preferably, the optical fibers coupled to these lenses is offset from the optical axes of these GRIN lenses so as to minimize back reflections.

For best spectral equalization results, the spectral response R of the etalon 10. shown in FIG. 2 is optimized by adjusting the reflectivity of the reflective surfaces 13 and 14. This can be done using techniques known to persons skilled in the art for adjusting the size of the amplitude valleys V of the spectral response R, relative to the amplitude peaks P. Such an optimization scheme allows for design trade-off between transmission bandwidth and insertion loss within an optical communication system. Preferably, the spectral response R of the etalon 10 is adjusted to have a low finesse ratio of less than 5%.

Alternative embodiments of the invention further include tuning means (not shown) for adjusting the spectral response R of the optical cavity 10 for a predetermined spacing between the amplitude valleys V thereof. For example, the effective distance of the path taken by the light entering the etalon can be varied by changing the dimension d of the cavity 15. Alternatively, the input angle of an incident light beam entering the etalon 10 can be adjusted in such a manner as to shift the wavelength to $\lambda'=\lambda \cos\theta$, where $\lambda$ is the wavelength of an amplitude valley V at normal incidence, $\theta$ is the light beam angle in the medium between the etalon reflective surfaces 13 and 14, and $\lambda'$ is the wavelength of the amplitude valley V at a light beam angle $\theta$. Using either of such tuning techniques, spacing between the amplitude valleys V of the spectral response R can be aligned with a predetermined channel spacing, where, the FSR of the etalon 10 is preferably set at substantially the same value as the channel spacing, or at an integer fraction thereof, e.g. ½, ⅓, etc. For example, the ITU channel plan has a 100 GHz frequency grid, requiring an FSR value of substantially 100 GHz.

The cavity 15 in alternative embodiments of the invention can contain air or another light transmissive medium having a different refraction coefficient than air such as glass, liquid crystal or sealed gas. In embodiments wherein air or another gas is used in the gap between the reflective surfaces 13 and 14, a change in density or composition—due to changes in pressure, temperature, or humidity—will affect the refractive index of the air or other gas, affecting the resonance and anti-resonance wavelengths. Thus, it is preferred to have the gas sealed or controlled to prevent wavelength drifting. An effective seal can be achieved by making a ring-shaped spacer to which transparent end-plates with mirror coatings on the inner surfaces thereof are attached with an airtight seal; one suitable method of attachment being "optical contacting". It is preferred that the spacer material have a low thermal expansion coefficient aL to reduce wavelength drifting $\Delta\lambda$ due to changes in temperature $\Delta T$ given by $\Delta\lambda=\Delta T\alpha\lambda$. Suitable materials are fused silica ($\alpha=5\times10^{-7\circ}$ C.$^{-1}$), where $\Delta\lambda/\Delta T=0.8$ pm/° C. at 1550 nm, or Zerodur™ ($\alpha=1\times10^{-7\circ}$ C.$^1$) where $\Delta\lambda/\Delta T=0.15$ pm/° C.; both such materials being suitable for optical contacting.

Other embodiments of the spectral equalizer disclosed above can include any type optical cavity than a low-finesse Fabry-Perot etalon 10, provided that such cavity is characterized by having a spectral response including a periodic series of anti-resonance wavelengths, wherein at least a portion of such wavelengths is similar to the central wavelengths $\lambda_1-\lambda_n$ of the multiplexed channels M. Yet, other embodiments can include different types of optical elements, such as Mach-Zehnder interferometers known to have a periodic response similar to what is required for this invention.

Figure 3:
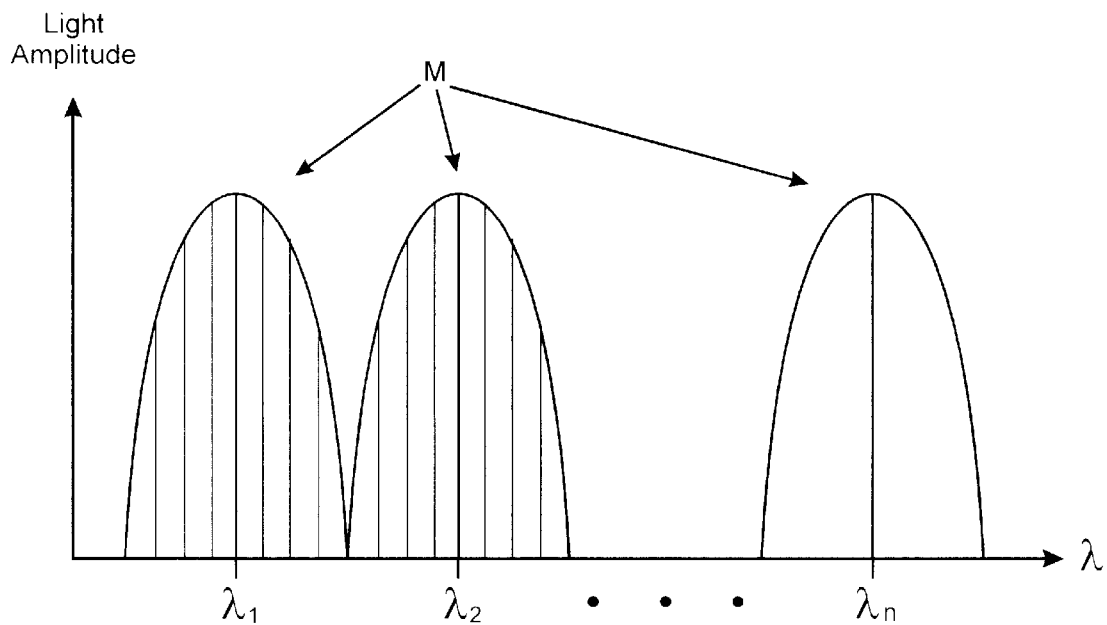
FIG. 3 is a graph illustrating amplitude-wavelength spectrum of a group of multiplexed channels having different central wavelengths, to be equalized in accordance with this invention.
Figure 5:
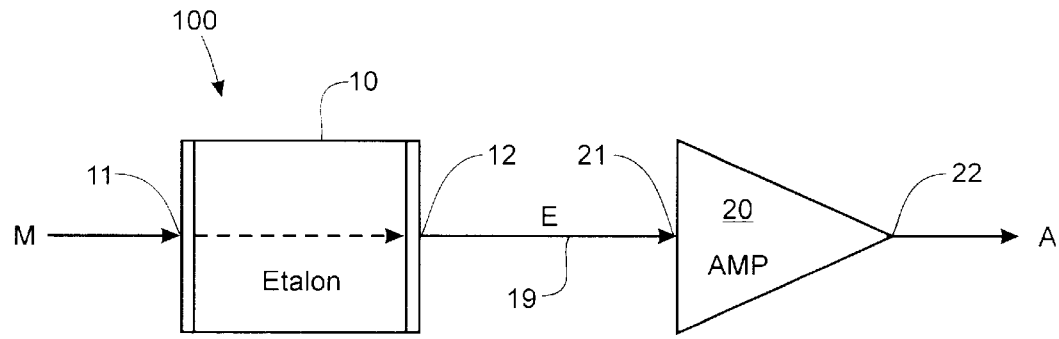
FIG. 5 is an alternative embodiment of the invention used in an optical communication system for equalizing and amplifying a group of multiplexed channels as illustrated in FIG. 3.

FIG. 5 is an alternative embodiment of the invention wherein the spectral equalizer disclosed above is used in an optical communication system for equalizing and amplifying a group of multiplexed channels is illustrated in FIG. 3. This embodiment operates in a similar manner to what is described for the embodiment illustrated in FIG. 1, with the addition of an amplifier 20 subsequent to the spectral equalizer 100. The amplifier 20 has a bandwidth that encompasses at least two adjacent channels within the group of multiplexed channels M received at the first port 11 of the equalizer 10. The amplifier 20 has an input port 21 optically coupled to the second port 12, and also has an output port 22.

When a light beam carrying a group of multiplexed optical channels M having central wavelengths $\lambda_1-\lambda_n$ is launched onto the spectral equalizer 100 through the first port 11, the spectrum of such received channels M is modified by the spectral response R of the optical element 10 as described above, with respect to the embodiment of FIG. 1. The equalized channels E, each having equalized amplitudes therein, provided by the equalizer second port 12 are then fed to the amplifier 20 at its input port 21. The net result is that amplified equalized channels E, as illustrated in FIG. 4, corresponding to the group of multiplexed channels Mreceived at the first port 11 are provided at the amplifier output port 22. The spectral amplitudes of the amplified equalized channels A are flatter (or more even) around the central wavelengths $\lambda_1-\lambda_n$ than those of the received channels M.

The amplifier 20 in the embodiment shown in FIG. 5 can be any conventional optical amplifier, preferably having a flat spectral response. In the case of an amplifier having a non-linear spectral response, the etalon finesse can be so adjusted as to compensate for the spectral non-linearity of both the amplifier and the received group of multiplexed channels.

Figure 6:
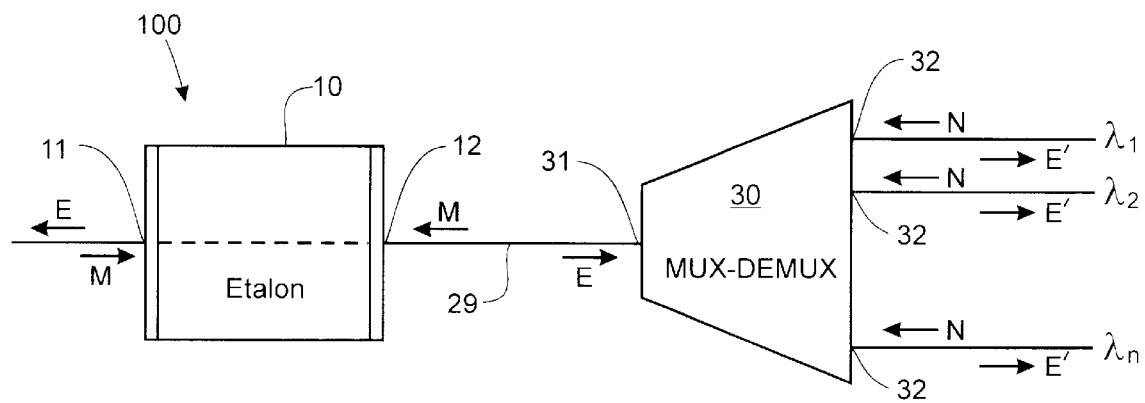
FIG. 6 is an alternative embodiment of the invention shown in FIG. 1 used in an optical communication system for equalizing, multiplexing and demultiplexing a group of wavelength channels as illustrated in FIG. 3.

FIG. 6 is an alternative embodiment of the invention wherein the spectral equalizer disclosed above is used in an optical communication system for equalizing and respectively multiplexing or demultiplexing a group of non-multiplexed or multiplexed channels having an amplitude-wavelength spectrum as illustrated in FIG. 3. This embodiment includes a spectral equalizer 100 similar to what is described for the embodiment shown in FIG. 1. The spectral equalizer 100 includes an optical element 10 having a two-directional periodically varying spectral response R as illustrated in FIG. 2. This embodiment further includes a multiplexer-demultiplexer 30 having a common port 31, and a plurality of n separate ports 32. The common port 31 is optically coupled to the equalizer second port 12 through an optical coupler 29. Several grating based devices are available to construct a multiplexer-demultiplexer 30 as required for this embodiment. These include phased array waveguide (AWG) devices and bulk diffraction grating devices.

When a light beam carrying a group of multiplexed optical channels M having central wavelengths $\lambda_1-\lambda_n$ is launched onto the spectral equalizer 100 through the first port 11, the spectrum of such received channels M is modified by the spectral response R of the optical element 10 as described above, with respect to the embodiment of FIG. 1. The amplitude-equalized channels E provided by the equalizer second port 12 are then fed to the multiplexer-demultiplexer 30 at its common port 31, to be demultiplexed and individually provided at the separate ports 32 as equalized demultiplexed channels E' as illustrated in FIG. 4, having more even spectral amplitudes around said central wavelengths $\lambda_1-\lambda_n$ within each channel than those of the collectively received channels M. Alternatively, when separate light beams carrying a group of non-multiplexed optical channels N having uneven spectral amplitudes peaked around the central wavelengths as illustrated in FIG. 3 are individually launched onto the separate ports 32, these channels N are multiplexed and collectively transferred from the common port 31 to the spectral equalizer 100 via the second port 12. The spectrum of such multiplexed channels M is then modified by the spectral response R of the optical element 10 as described above, with respect to the embodiment of FIG. 1. The net result is that multiplexed channels E, each having equalized amplitudes therein, as shown in FIG. 4, corresponding to the group of non-multiplexed channels N received at the separate ports 31 are collectively provided at the equalizer first port 11. The spectral amplitudes of the equalized channels E are more even around the central wavelengths $\lambda_1-\lambda_n$ than those of the received channels N.

In alternative embodiments to the one shown in FIG. 6, the multiplexing and demultiplexing functions are separately performed within two symmetrical systems. Both such systems can have a similar configuration to what is shown in FIG. 6, where one system includes a spectral equalizer and a multiplexer and another includes a spectral equalizer and a de-multiplexer.

It is understood that numerous other embodiments may be envisaged without departing from the spirit and scope of the invention. For example, the spectral equalizer described above can have the form of a non-optical filter having a periodic spectral response similar to that illustrated in FIG. 2, for use in non-optical communication systems, such as for microwave or radio communications. In such embodiments the filter can include a cavity resonator characterized by having a spectral response including a periodic series of anti-resonance wavelengths, wherein at least a portion of such wavelengths is similar to the central wavelengths $\lambda_1$–$\lambda_n$ of the multiplexed channels M. Such a filter can then be used within a non-optical communication (e.g. radio or microwave) systems to provide alternative non-optical embodiments to those disclosed above with respect to FIGS. 5 and 6, and described variations thereof.

What is claimed is:

1. An optical spectral equalization system for equalizing amplitudes within each channel of a group of multiplexed channels having different predetermined central wavelengths, said system comprising:

a Fabry-Perot etalon having a periodically varying spectral response characterized by amplitude valleys aligned individually with the different central wavelengths;

a first port optically coupled to said optical element for receiving said group of multiplexed channels; and a second port optically coupled to said Fabry-Perot etalon for providing a group of equalized channels corresponding to the group of multiplexed channels in accordance with said spectral response;

so that when multiplexed channels having uneven spectral amplitudes peaked around the central wavelengths thereof are received at the first port, the second port provides corresponding equalized channels having more even spectral amplitudes around said central wavelengths within each channel than the received channels.

2. An optical spectral equalization system as defined in claim 1, wherein the Fabry-Perot etalon comprises an optical cavity having a spectral response including a periodic series of anti-resonance wavelenghts, at least a portion thereof being similar to the central wavelenghts of the multiplexed channels.

3. An optical spectral equalization system as defined in claim 2, wherein the optical cavity forms part of a low-finesse Fabry-Perot etalon.

4. An optical spectral equalization system as defined in claim 3, wherein the optical cavity contains light transmissive material.

5. An optical spectral equalization system as defined in claim 3, further comprising tuning means for adjusting the spectral response of said optical cavity for a predetermined spacing between the amplitude valleys thereof.

6. An optical spectral equalization system as defined in claim 3, wherein the etalon has a free spectral range of substantially similar value to a predetermined channel spacing, or an integer fraction thereof.

7. An optical spectral equalization system as defined in claim 1, wherein the first port is disposed for receiving multiplexed channels from free space.

8. An optical spectral equalization system as defined in claim 1, further comprising graded index lenses disposed at the first port and the second port respectively in a manner to enable collimating the multiplexed channels out of and into an optical waveguide coupled thereto.

9. An optical equalization system as defined in claim 1, further comprising a multiplexer-demultiplexer comprising:

a common port optically coupled to the second port for collectively transferring multiplexed channels between the Fabry-Perot etalon and the demultiplexer, a plurality of separate ports each for individually providing an equalized demultiplexed channel and for individually receiving a non-multiplexed channel; so that:

when non-multiplexed optical channels having uneven spectral amplitudes peaked around the central wavelengths thereof are individually received at the separate ports, the first port collectively provides corresponding equalized multiplexed channels having more even spectral amplitudes around said central wavelengths within each channel than the individually received channels; and when multiplexed channels having uneven spectral amplitudes peaked around the central wavelengths thereof are collectively received at the first port, the separate ports individually provide corresponding equalized demultiplexed channels having more even spectral amplitudes around said central wavelengths within each channel than the collectively received channels.

10. A method of equalizing a group of multiplexed communication channels having different predetermined central wavelengths and uneven spectral amplitudes peaked around the central wavelengths, said method comprising the step of collectively launching said multiplexed communication channels onto a Fabry-Perot etalon characterized by a periodically varying spectral response having amplitude valleys aligned individually with the different central wavelengths, so that the spectral amplitudes of the multiplexed communication channels are modified to become more even around said central wavelengths within each channel.

11. A method as defined in claim 10, wherein the Fabry-Perot etalon comprises a cavity resonator having a periodic series of minimum-amplitude wavelengths, at least a portion thereof being similar to the central wavelengths of the multiplexed communication channels.

12. A method of equalizing a group of multiplexed optical channels having different predetermined central wavelengths and uneven spectral amplitudes peaked around the central wavelengths, said method comprising the step of collectively launching said multiplexed optical channels onto a Fabry-Perot etalon having a periodically varying spectral response characterized by amplitude valleys aligned individually with the different central wavelengths, so that the spectral amplitudes of the multiplexed optical channels are modified to become more even around said central wavelengths within each channel.

13. A method as defined in claim 12, wherein the Fabry-Perot etalon comprises an optical cavity having a periodic series of anti-resonance wavelengths, at least a portion thereof being similar to the central wavelengths of the multiplexed optical channels.

14. A method as defined in claim 13, wherein the optical cavity forms part of a low-finesse Fabry-Perot etalon.

* * * * *